United States Patent [19]

Holmquist

[11] 4,186,242

[45] Jan. 29, 1980

[54] PREPARATION OF A LIGNOCELLULOSIC COMPOSITE

[75] Inventor: Howard W. Holmquist, Bellingham, Wash.

[73] Assignee: Georgia-Pacific Corporation, Portland, Oreg.

[21] Appl. No.: 664,539

[22] Filed: Mar. 8, 1976

[51] Int. Cl.² .................. B32B 27/42; C09J 5/04
[52] U.S. Cl. .............................. 428/528; 106/123 LC; 156/318; 156/336; 156/331; 260/17.5; 427/303; 427/333; 427/408; 427/325; 427/342; 427/415; 428/535; 428/541
[58] Field of Search ............... 156/331, 90, 336, 314, 156/307, 318, 310; 427/408, 303, 415, 325, 333, 342; 428/528, 541, 535; 106/123 LC, 123 R; 260/17.5, 124 R

[56] References Cited

U.S. PATENT DOCUMENTS

| | | | |
|---|---|---|---|
| 2,537,343 | 1/1951 | Golick et al. | 156/310 |
| 2,585,977 | 2/1952 | Uschmann | 260/17.2 |
| 2,786,008 | 3/1957 | Herschler | 260/17.5 |
| 2,786,820 | 3/1957 | Uschmann | 260/17.2 |
| 2,833,670 | 5/1958 | Roth | 428/272 |
| 2,870,041 | 1/1959 | Waddle et al. | 427/342 |
| 2,981,652 | 4/1961 | Peterson et al. | 260/29.3 |
| 3,076,738 | 2/1963 | Uschmann | 156/331 |
| 3,267,053 | 8/1966 | Nagle et al. | 156/335 |
| 3,296,159 | 1/1967 | Lissner | 260/17.5 |
| 3,556,897 | 1/1971 | Christoffersen et al. | 156/335 |
| 3,931,072 | 1/1976 | Coyle | 156/335 |
| 3,994,850 | 11/1976 | Willegger et al. | 260/29.4 R |

OTHER PUBLICATIONS

Walker, *Formaldehyde* (3rd Edition), ACS Monograph Series, Index for Chapters 9–16 and p. 1 of Chapter 8.
Goheen, et al. *Lignin* Kirk–Othmer ECT, vol. 12, pp. 369–372, 1967.

*Primary Examiner*—John T. Goolkasian
*Assistant Examiner*—J. J. Gallagher
*Attorney, Agent, or Firm*—Peter P. Chevis

[57] ABSTRACT

A process for the preparation of lignocellulosic composite using urea-formaldehyde adhesive is described characterized by treating the lignocellulosic constituents with ammonium-base lignosulfonate prior to pressing to decrease the emission of formaldehyde.

10 Claims, No Drawings

PREPARATION OF A LIGNOCELLULOSIC COMPOSITE

This invention pertains to a process for the preparation of lignocellulosic composite. More particularly, it pertains to the preparation of plywood and composition board using urea-formaldehyde adhesive.

In preparation of lignocellulosic composites, such as plywood and composition boards for interior use, urea-formaldehyde adhesive is predominately used. The adhesive has good bonding properties and other characteristics which permit it to be used in high-speed processes for the preparation of the various boards or products. While the adhesive has many advantages, urea-formaldehyde adhesive has a disadvantage in that "free" formaldehyde is formed in the composite during curing or due to some decomposition resulting in the liberation or emission of formaldehyde from the finished composite. While the amount of the formaldehyde being liberated may be small, sufficient amounts may be emitted to provide a detectable formaldehyde odor which is objectionable. The emission of the formaldehyde is most pronounced shortly after the board preparation. Thus, the use of a composite such as interior paneling soon after preparation, especially in closed areas, may result in formaldehyde odor complaints.

It is therefore an object of this invention to provide an improved process for the preparation of a lignocellulosic composite using urea-formaldehyde adhesive. A further object is to provide a process for preparation of lignocellulosic composites using urea-formaldehyde characterized by the minimization of the liberation of formaldehyde from the composite after preparation and during the preparation of the composite.

The above and other objects are attained by this invention which comprises treating the lignocellulosic constituents used in preparation of the composite with a sufficient amount of an ammonium-base lignosulfonate to decrease the emission of formaldehyde from the urea-formaldehyde resin used in the adhesive in the preparation of the composite. By treating the lignocellulosic constituents with the ammonium-base lignosulfonate, the liberation or the emission of formaldehyde generally obtained after the formation of the composite is significantly reduced such that the product may be used shortly after preparation in closed areas without the liberation of objectionable quantities of formaldehyde.

The processes and equipment presently used in the preparation of plywood and composition board such as particleboard, chipboard, flakeboard, fiberboard and hardboard may be used with the present invention. The same conditions and constituents may be employed with the exception that the lignocellulosic constituents or wood particles or veneer are treated or contacted with an ammonium-base lignosulfonate, preferably prior to or after the adhesive application. The various known methods of contacting solid particles with other constituents may be used in contacting or treatment of the lignocellulosic constituents with the lignosulfonate. A convenient method is to contact the constituents with the lignosulfonate by spraying a lignosulfonate solution on the constituents prior to the application of the adhesive. The treatment of the wood particles with the lignosulfonate is carried out separately from the adhesive application. The addition or mixing of ammonium-base lignosulfonate with the resin will usually significantly lower the bond strength and result in gelation of the mixture in relatively short time making the use of the mixture impractical. However, since the adhesive generally only covers a portion of the particle or veneer surface and is relatively immobile when on the surface, the adhesive and the lignosulfonate may be simultaneously applied to the constituents, for example as spraying through separate nozzles, as long as the adhesive and the lignosulfonate do not become intimately mixed before contacting the particles. The ammonium lignosulfonate may also be mixed and applied with constituents other than the urea-formaldehyde adhesive with which the particles may be treated, such as for example, wax emulsion in particleboard manufacture. In many mills, the wax emulsion is not intermixed with the adhesive but is applied separately.

The lignocellulosic constituents are contacted or treated with the ammonium-base lignosulfonate in an amount sufficient to decrease the formaldehyde liberation or emission to non-objectionable levels. Generally, the amounts used will vary depending upon the particular composite being prepared, the use to be made of the product, and the particular urea-formaldehyde adhesive mixture used. For composites which may be used shortly after manufacture in confined places, such as particleboard paneling, the amount used may be in the range of from about 5 to 25 percent of lignosulfonate solids, based upon the weight of urea-formaldehyde resin in the adhesive, preferably, in the range of 10 to 20 weight percent of the resin. While the amount used may be increased above 25 percent up to, for example, 35 to 40 percent of the urea-formaldehyde resin content, some decrease in strength of the board or composite may result. Likewise, the amount may be less than 5 percent for particular composites that will not be used in closed areas or with resins having relatively low formaldehyde liberation or emission.

In application of the ammonium lignosulfonate to the constituents, generally a relatively concentrated aqueous solution containing from 40 to 50 percent solids is used. The concentration of solution used is immaterial to the effectiveness of the lignosulfonate in its decrease in the formaldehyde liberation, but the water from the more dilute solutions increases the moisture levels which may have a dilution effect upon the adhesive. When concentrated lignosulfonate solutions above about 40% concentration are used, the constituents can be treated with a lignosulfonate solution to the extent required with the urea-formaldehyde resin adhesive being at a concentration ordinarily used in a composite preparation. With dilute lignosulfonate solutions at the higher usages, more concentrated urea-formaldehyde resin may be desirable to offset the additional water. The ammonium-based lignosulfonate may also be applied in solid form by contacting the particles with powdered lignosulfonate.

The lignosulfonate used has to be the ammonium-based lignosulfonate which may be obtained by sulfonation of lignin obtained from any source by the various known methods. One of the main sources of lignosulfonate is the residual pulping liquors of the paper and pulp industries where lignocellulosic materials such as wood, straw, corn stalks, bagasse, and the like are processed to separate the cellulose or pulp from the lignin. In the sulfite pulping process, the lignocellulosic material is digested with a bisulfite or sulfite to obtain a sulfonated residual pulping liquor commonly referred to as "spent sulfite liquor" wherein the sulfonated lignin is dissolved. In other pulping processes, the residual pulping liquor as obtained from the process may not be a sulfonated product. However, the residual liquors or products containing the lignin portion of the lignocellulosic materials from the sulfite or other processes may be treated by the various known methods to sulfonate the lignin to the different degrees desired. For example, the residual liquor obtained in an alkaline process of digestion of lignocellulosic materials such as kraft, soda and other alkali processes may be sulfonated by reacting the product with a bisulfite or sulfite to obtain a sulfonated residual pulping liquor. Likewise, lignins known as "hydrolysis lignin" obtained from the hydrolysis of lignocellulosic materials in manufacturing wood sugars, or "hydrotropic lignins" derived from hydrotropic pulping processes may be sulfonated and used.

The sulfonated lignins obtained by sulfonation of lignin may be salts of cations other than ammonium, such as magnesium, calcium, sodium, potassium and the like. These lignosulfonate salts may be converted to ammonium lignosulfonate by use of ion exchange resins or base exchange reactions. In addition, the lignosulfonate products obtained from the sulfite pulping process or by the sulfonation of other residual pulping liquors or lignin-containing materials usually contain many other constituents besides sulfonated lignin. For example, spent sulfite liquor generally contains about 40 to 60 weight percent of lignosulfonate with the remainder being carbohydrates and other organic and inorganic compounds dissolved in the liquor. The spent sulfite liquor or the products as obtained is generally used, but the non-lignosulfonate constituents may be removed by the various known methods. For example, carbohydrates may be removed by means such as oxidation, dialysis or fermentation. The removal of some of the constituents, for example, by fermentation of the sugars and recovery of the alcohol or yeast thereby produced, may be conveniently carried out. Also, heating the pulping liquor under alkaline or acid conditions results in converting some of the non-lignin constituents in the pulping liquor to non-reactive constituents. In the alkaline treatment, an alkali metal hydroxide, oxide or carbonate is preferably used.

To further illustrate the invention, a southern pine furnish comprising a blend of planer shavings, sawdust, comminuted plywood trim was used in preparation of a series of ¾-inch particleboard samples for which the formaldehyde emission was determined.

The furnish containing about 8 percent moisture was placed in a rotating cascade blender and an ammonium-base spent sulfite liquor having a solids content of 47 weight percent was sprayed on the particles in the blender in an amount of about 1.2 percent of the bone dry weight of furnish. The ammonium-base liquor was obtained by base exchanging a fermented calcium-base spent sulfite liquor. Shortly after the application of the spent sulfite liquor, a urea-formaldehyde resin adhesive commercially used in particleboard manufacture was applied. The urea-formaldehyde adhesive contained 65% urea-formaldehyde resin and was applied in an amount of 6½% resin solids based upon the bone dry furnish. After blending for 10 minutes, the product was placed in a caul or a frame one-foot square in an amount to obtain a density of about 48 pounds per cubic food and pressed to ¾ inch by a platen heated to a temperature of 320° F. The press time was 4½ minutes. The panel was conditioned at room temperature for about five days and then the formaldehyde emission determined.

The test used for the determination of the formaldehyde liberated was similar to that described in the *Forest Products Journal*, Vol. 22, No. 4, pp. 17–20, in an article entitled, "Test for Measuring Formaldehyde Emission from Formaldehyde Resin Bonded Particleboards and Plywood." The test comprises grinding the board sample and placing 50 grams of the sample in a flask connected to a receiving flask containing about 10 millimeters of water. The receiving flask is placed in an ice-water bath. The apparatus is evacuated and then the flask containing the board sample is placed in boiling water and heated for three hours. After the three-hour heating period, the receiving flask is removed and the formaldehyde content in the water-formaldehyde mixture is determined by adding sodium sulfite and titrating the mixture with dilute hydrochloric acid to a colorless end point using thymolphthalein indicator. The result obtained is expressed as weight percent of "formaldehyde in the board" in millipercent ($10^{-3}\%$). The results obtained by the above procedure indicated that the board contained 13.1 millipercent formaldehyde.

A second particleboard sample was prepared with the same furnish in a manner similar to that described above, except that the ammonium-base spent sulfite liquor was intermixed with a wax emulsion containing about 47 percent by weight of wax prior to spraying on the furnish. The ammonium-base spent sulfite liquor and the wax emulsion were mixed in amounts such that upon application of 1 percent wax to the furnish, about 1.2 weight percent of ammonium spent sulfite liquor solids was applied to the furnish on bone dry basis. The formaldehyde content of the ¾-inch particleboard so prepared was determined as above and found to be 14.4 millipercent. A third sample of particleboard was prepared in a manner similar to that above except the wax emulsion containing the ammonium-base lignosulfonate was sprayed on the furnish after the urea-formaldehyde adhesive was applied. The formaldehyde content of the board was 11.2 millipercent.

When particleboard samples were prepared as above but without treatment of the furnish with either the lignosulfonate or wax emulsion, the formaldehyde content of the board was 25.7 millipercent. Treatment of the furnish with wax emulsion without the lignosulfonate prior to the urea-formaldehyde adhesive application resulted in a particleboard having a formaldehyde content of 23.5 millipercent. A commercial particleboard purchased in a retail store when analyzed as above, was found to contain 28.7 millipercent of formaldehyde.

What is claimed is:

1. In a process for the preparation of a lignocellulosic composite wherein an urea-formaldehyde resin adhesive is used and the composite is formed by pressing lignocellulosic constituents after application of the adhesive to the constituents, the improvement of decreasing the emission of formaldehyde from the composite, which comprises treating the lignocellulosic constituents separate from the adhesive application step prior to pressing with a sufficient amount of ammonium-base lignosulfonate to decrease the formaldehyde emission from the composite.

2. A process according to claim 1 wherein the lignocellulosic constituents are treated with the ammonium-base lignosulfonate in an amount of 5 to 25 weight percent of the urea-formaldehyde resin in the adhesive.

3. A process according to claim 2 wherein the lignocellulosic constituents are treated with from 10 to 20 weight percent of the urea-formaldehyde resin used in the adhesive.

4. A process according to claim 3 wherein the ammonium-base lignosulfonate is a spent sulfite liquor and the lignocellulosic constituents are treated with the ammonium-base spent sulfite liquor before or after the application of the adhesive.

5. A process according to claim 4 wherein the lignocellulosic constituents are veneer plys.

6. A process according to claim 4 wherein the composite is a composition board.

7. A process according to claim 6 wherein the composition board is a particleboard.

8. A lignocellulosic composite obtained by the process of claim 1.

9. A plywood obtained by the process of claim 5.

10. A particleboard obtained by a process of claim 7.

* * * * *